United States Patent [19]

Ambs et al.

[11] 4,312,780

[45] Jan. 26, 1982

[54] REACTIVATION OF SPENT CHROMIA-ALUMINA CATALYST BY ZINC OXIDE DOPING

[75] Inventors: William J. Ambs, Swarthmore; Maurice M. Mitchell, Jr., Wallingford, both of Pa.

[73] Assignee: Air Products and Chemicals, Inc., Allentown, Pa.

[21] Appl. No.: 187,307

[22] Filed: Sep. 15, 1980

[51] Int. Cl.³ .......................... B01J 21/20; B01J 23/92
[52] U.S. Cl. ................................ 252/412; 252/411 R; 252/416; 252/465
[58] Field of Search ................ 252/411 R, 412, 416, 252/465; 585/630, 662

[56] References Cited

U.S. PATENT DOCUMENTS

| | | |
|---|---|---|
| 2,265,641 | 12/1941 | Grosskinsky et al. ............ 585/631 |
| 2,375,402 | 5/1945 | Corson et al. .................... 252/465 |
| 2,382,394 | 8/1945 | Bremner et al. .................. 585/662 |
| 2,395,875 | 3/1946 | Kearby ............................. 585/444 |
| 2,901,419 | 8/1959 | Brill ................................. 208/119 |

*Primary Examiner*—W. J. Shine
*Attorney, Agent, or Firm*—E. Eugene Innis; William F. Marsh; Michael Leach

[57] ABSTRACT

A method for the reactivation of aged chromia-alumina dehydrogenation catalyst which involves doping the aged catalyst with minor amounts of zinc oxide, preferably in the range of about 0.35% zinc oxide to 1.35% zinc oxide on the catalyst. The zinc oxide is added to the aged catalyst preferably by impregnation by immersion or spraying of a zinc nitrate solution, followed by drying and heat treating. Alternatively the zinc oxide addition can be accomplished by use of a volatile organic zinc compound added to the saturated feedstock and subsequent air regeneration of the catalyst in situ without removal of the catalyst from the reactor.

7 Claims, No Drawings

REACTIVATION OF SPENT CHROMIA-ALUMINA CATALYST BY ZINC OXIDE DOPING

TECHNICAL FIELD

This invention relates to a method for the reactivation of used chromia-alumina dehydrogenation catalysts. Such catalysts are used in the dehydrogenation of alkanes and alkenes to form the corresponding olefins or di-olefins.

BACKGROUND OF THE PRIOR ART

Chromia-alumina catalysts have been used for the dehydrogenation of alkanes and alkenes to form the corresponding olefins or di-olefins. Typically the process for such dehydrogenation is a cyclic process wherein the alkanes are passed over the chromia-alumina catalyst in a reactor during which time the feedstock is dehydrogenated to the olefin or di-olefin with the concomitant generation of coke on the catalyst. Subsequently, the catalyst is regenerated by passing a heated airstream through the coked catalyst, thereby oxidizing, or burning, the coke off of the catalyst. The catalyst bed is subsequently returned to dehydrogenation service. After a large number of regeneration cycles, the activity of the regenerated catalyst decreases. This fall-off in activity is measured by reduced conversion of the saturated feedstock and also by a reduction in the yield of coke on the catalyst. A certain amount of coke formation is required to provide adequate heat to the catalyst bed during the oxidative regeneration in order to maintain the heat balance. When the activity of the regenerated catalyst has fallen enough, the catalyst must be replaced with a fresh load of catalyst.

While the prior art contains examples of chromia-alumina dehydrogenation catalysts containing minor amounts of zinc, for example U.S. Pat. Nos. 2,375,402 and 2,395,875, the zinc has generally been added as a stabilizer to improve the physical resistance of the alumina to the high temperatures of the dehydrogenation reaction and regeneration. Additionally zinc has been added to cracking catalysts to overcome the results of metal contaminants deposited on the catalyst. U.S. Pat. No. 2,901,419 is representative of those wherein the effect of the zinc addition is said to reduce the coke fomation caused by the metal contaminants. U.S. Pat. No. 2,265,641 discloses a dehydrogenation catalyst comprising at least 50% ZnO.

SUMMARY OF THE INVENTION

It has been discovered that the aged chromia-alumina catalyst employed in the dehydrogenation process can be reactivated by the addition of a minor amount of zinc oxide, preferably between approximately 0.35% and 1.35% based upon the weight of catalyst, to the aged catalyst. A preferred method of addition of the zinc oxide to the aged catalyst is the impregnation of the catalyst by immersion or spraying of a zinc nitrate aqueous solution. The catalyst is then dried and heat treated by heating to a temperature of between approximately 700° F. to approximately 1200° F. in dry air. The catalyst can then be returned to the dehydrogenation reactor and dehydrogenation commenced. Alternatively, the zinc oxide can be added to the catalyst by means of volatile organic zinc compounds such as dialkyl zinc, diethyl zinc or dimethyl zinc, for example, or zinc dialkoxide, such as for example zinc diethoxide or zinc dimethoxide. Such volatile zinc compounds can be added to the feed stream during dehydrogenation. Subsequent regeneration of the catalyst at elevated temperature with air will oxidize the compound to zinc oxide on the catalyst.

DETAILED DESCRIPTION OF THE INVENTION

Typical chromia-alumina catalysts to which this reactivation process is applicable are those described in U.S. Pat. Nos. 2,790,015; 2,956,030; and 2,945,823.

The aged chromia-alumina catalyst suitable for the practices of the present invention would typically have been in cyclic dehydrogenation service for from about 500 to several thousand hours. The particular length of time that such catalyst is retained in service and the activity level at which the catalyst is removed from service for reactivation by the method of the present invention would depend upon the economic consideration of the reduced conversion and yield as opposed to the cost of reactivating the catalyst.

In a preferred embodiment the aged chromia-alumina catalyst is reactivated by the addition of zinc oxide according to the following example.

EXAMPLE 1

500 grams of Catalyst 1 comprising a chromia-alumina catalyst containing about 19% chromium as $Cr_2O_3$ having been in dehydrogenation service for a period of 502 days was reactivated as follows. Twelve grams of zinc nitrate hexahydrate was dissolved in water to make a total volume of 145 millimeters of zinc nitrate solution. The catalyst was impregnated with the solution by allowing the catalyst to stand in the solution for one hour with occasional shaking, after which no excess solution was present. The catalyst was then dried at 250° F. for two hours. The catalyst was then heat treated at 1050° F. for two hours while passing dry air through the catalyst. The resulting catalyst contains 0.66% zinc oxide on a weight basis. The resulting reactivated catalyst was identified as Catalyst 2.

EXAMPLE 2

A second portion of Catalyst 1 was reactivated in the same manner as Example 1 except that 24 grams of zinc nitrate hexahydrate is employed to prepare the zinc nitrate solution. The resulting catalyst contained 1.32% zinc oxide on a weight basis and is identified as Catalyst 3.

The performance of the reactivated catalyst compared to fresh unaged catalyst, and the aged Catalyst 1 are shown in Table 1. The test method for determining the various yields and conversions to determine the conversion of N-butane to yield butenes and butadiene are as follows.

Thirty cubic centimeters of catalyst are dried, reduced, and then reacted with n-butane to determine the conversion of n-butane and the yields of butenes, butadines, and coke. Standard test conditions are: n-butane feed, LHSV=1, 120 mm. Hg absolute pressure, and average run temperatures of 1000° F., 1050° F., and 1100° F. The general test routine is as follows:

A. Thirty cubic centimeters (30 cc.) of catalyst are charged to a Vycor quartz reaction tube, the catalyst bed being positioned by volumes of tabular alumina to lie within a prescribed internal section of the tube. The tube is mounted vertically in a furnace in such a manner that the catalyst will be located in the area which by a previous survey has demonstrated isothermal stability. Connections between the tube and the flow system are made through vacuum tight standard taper glass joints.

B. The system is evacuated and tested for leaks. Following this, the vacuum is broken with hydrogen at a rate of 100 cc. per minute. This flow is continued for 3 minutes after the internal pressure reaches one atmosphere.

C. The system is once again evacuated, sealed, and pressure tested for a short period.

D. n-Butane is introduced at a rate equivalent to 0.292 g. per minute for a period of 10 minutes. When the system pressure has reached 120 mm. Hg absolute, product gases are removed through a manually controlled valve at a rate which will maintain a reactor pressure of 120 mm. for the duration of the reaction period. Following this, feed gas flow ceases and all material residual to the reactor is rapidly pumped into the product collection system.

During the reaction period, condensable materials are collected in a dropout tube which is located downstream from the pressure control valve and which is cooled with liquid nitrogen. The uncondensable portion of the product is pumped into a gas collecting vessel by means of a mechanical pump which contains castor oil. Following the reaction period, the evacuated reaction tube is isolated from the product recovery system in order that catalyst regeneration may be accomplished. The trapped condensables are now transferred directly to the gas collecting vessel by initially flashing the product, and by finally removing the residual gas by means of a Toepler pump.

E. Air is now passed through the catalyst bed at a rate suitable to provide for oxidation of the residual coke. The products of this regeneration are passed in order through a CO oxidation unit, a drying tube, and a $CO_2$ absorber. A gravimetric measurement of the coke value is determined from the increased weight of the $CO_2$ absorber. The catalyst is now in an oxidized condition, and the entire test cycle may be repeated.

F. Samples are taken from the reconstituted dry gas product for gas gravity determination and for chromatographic analysis.

As can be seen from Table 1, both conversion and coke yield of the reactivated used catalyst is significantly improved by the addition of the zinc oxide.

The aged dehydrogenation catalyst may be removed from the reactor for reactivation according to the methods of this invention by soaking in the zinc salt solution or by spraying of the catalyst with the solution or by other equivalent application means, followed by drying and the heat treat step, which could be performed in the reactor. Alternatively, the zinc could be added to the aged catalyst according to the following example.

EXAMPLE 3

In a cyclic dehydrogenation process, the chromia-alumina catalyst bed is subjected to an approximate ten minute cycle of reaction followed by purging and air regeneration.

During the reaction (on stream) part of the cycle, liquid volatile organic zinc compound is simply metered into the liquid butane feed upstream of the point of butane vaporization via a sidestream input line. Examples of such zinc compounds suitable for practice of this method are dimethyl, diethyl and di-iso-propyl zinc, and zinc dimethoxide, diethoxide. Other volatile organic zinc compounds which could be decomposed in situ at temperatures below about 1200° F. would also be suitable. The alkoxides would have a definite safety advantage in that they would not be spontaneously combustible in air as are the alkly zinc compounds. Sufficient zinc can be added this way to achieve the desired result over a small number of cycles. During the regeneration cycle, oxidative decomposition will occur, breaking the zinc-carbon bond and resulting in the formation of ZnO.

This procedure has the advantage of allowing control of the total amount of zinc oxide addition by monitoring the heat balance (observed reactor temperature profile) as the reaction proceeds. The preferred level of ZnO on the catalyst is between 0.35% and 1.35%.

| Run Temp °F. | CATALYST | Butane Conv. % | Butadiene Yld % | Butadiene Sel % | Butenes Yld % | Butenes Sel % | Coke Yld % | Coke Sel % | Gas Yld % | Gas Sel % |
|---|---|---|---|---|---|---|---|---|---|---|
| 1000 | Catalyst 1 | 28.6 | 4.89 | 17.1 | 21.6 | 75.5 | 0.25 | .88 | 1.03 | 3.61 |
|  | Catalyst 2 (0.66% ZnO) | 40.3 | 6.86 | 17.0 | 30.0 | 74.5 | 0.74 | 1.84 | 1.47 | 3.65 |
|  | Catalyst 3 (1.32% ZnO) | 40.3 | 6.09 | 15.1 | 25.6 | 63.6 | 4.9 | 12.23 | 2.20 | 5.46 |
| 1050 | Catalyst 1 | 47.8 | 11.38 | 23.8 | 31.5 | 65.9 | 0.44 | .92 | 2.54 | 5.31 |
|  | Catalyst 2 (0.66% ZnO) | 55.9 | 12.71 | 22.8 | 35.0 | 62.6 | 2.05 | 3.67 | 3.51 | 3.67 |
|  | Catalyst 3 (1.32% ZnO) | 56.5 | 10.61 | 18.8 | 28.2 | 49.9 | 10.7 | 18.96 | 4.40 | 7.78 |
| 1100 | Catalyst 1 | 62.1 | 18.13 | 29.2 | 32.6 | 52.6 | 1.92 | 3.09 | 6.21 | 10.01 |
|  | Catalyst 2 (0.66% ZnO) | 65.0 | 18.38 | 28.3 | 29.0 | 44.7 | 5.11 | 7.87 | 8.41 | 7.87 |
|  | Catalyst 3 (1.32% ZnO) | 68.9 | 13.70 | 19.9 | 21.6 | 31.4 | 21.3 | 30.93 | 8.75 | 12.69 |

EFFECT OF ZINC ADDITION TO AGED CHROME ALUMINA CATALYST
Butane Dehydrogenation at LHSV=1, Isothermal Data

We claim:

1. The method of reactivating an aged chromia-alumina dehydrogenation catalyst which has reduced coke yield activity, which method comprises doping the aged catalyst with a minor amount of zinc oxide.

2. The method of claim 1 wherein the doping with zinc oxide is carried out by the steps of impregnating the aged chromia-alumina catalyst with an aqueous solution of zinc nitrate; drying the impregnated aged catalyst; and heat treating the dried catalyst at a temperature from about 700° F. to about 1200° F. in the presence of dry air.

3. The method of claim 1 wherein the aged chromia-alumina catalyst is doped with zinc oxide in situ by the addition of a volatile organic zinc compound to the dehydrogenation reactor feedstream, followed by regeneration of the catalyst with air.

4. The method of claim 3 wherein the volatile organic zinc compound is a dialkyl zinc.

5. The method of claim 3 wherein the volatile organic zinc compound is selected from the group consisting of dimethyl zinc, diethyl zinc and d-iso-ipropyl zinc.

6. The method of claim 3 wherein the volatile organic zinc compound is selected from the group consisting of zinc dimethoxide and zinc diethoxide.

7. The method of claims 1, 2 or 3 wherein the aged catalyst is doped with about 0.35% to about 1.35% by weight of zinc oxide.

* * * * *